United States Patent [19]

Searby et al.

[11] Patent Number: 5,459,529
[45] Date of Patent: Oct. 17, 1995

[54] VIDEO PROCESSING FOR COMPOSITE IMAGES

[75] Inventors: Anthony D. Searby; Paul R. N. Kellar, both of Newbury, Great Britain

[73] Assignee: Quantel, Ltd., Newbury, England

[21] Appl. No.: 444,560

[22] Filed: Dec. 1, 1989

Related U.S. Application Data

[60] Continuation of Ser. No. 761,348, Jul. 31, 1985, abandoned, which is a division of Ser. No. 457,098, Jan. 10, 1983, Pat. No. 4,602,286.

[51] Int. Cl.$^6$ ................................................. H04N 5/272
[52] U.S. Cl. .......................................... 348/586; 348/584
[58] Field of Search ........................ 358/183, 22, 182; 348/578, 582, 584, 586, 588, 589, 598, 599, 600

[56] References Cited

U.S. PATENT DOCUMENTS

| | | |
|---|---|---|
| 1,360,085 | 11/1920 | Bradley . |
| 2,565,912 | 8/1951 | Davis . |
| 3,192,315 | 6/1965 | Remley . |
| 3,672,742 | 6/1972 | Barg . |
| 3,846,826 | 11/1974 | Mueller . |
| 3,936,636 | 2/1976 | Percival . |
| 4,028,727 | 6/1977 | Skrydstrup . |
| 4,070,710 | 1/1978 | Sukonick et al. ............... 364/900 |
| 4,103,331 | 7/1978 | Thacker . |
| 4,148,070 | 4/1979 | Taylor . |
| 4,156,237 | 5/1979 | Okada et al. . |
| 4,163,249 | 7/1979 | Michael et al. . |
| 4,172,264 | 10/1979 | Taylor et al. . |
| 4,189,743 | 2/1980 | Schure et al. . |
| 4,189,744 | 2/1980 | Stern . |
| 4,200,867 | 4/1980 | Hill . |
| 4,232,311 | 11/1980 | Agneta . |
| 4,240,104 | 12/1980 | Taylor et al. . |
| 4,240,106 | 12/1980 | Michael et al. . |

(List continued on next page.)

FOREIGN PATENT DOCUMENTS

| | | |
|---|---|---|
| 1178330 | 1/1970 | United Kingdom . |
| 1226559 | 3/1971 | United Kingdom . |
| 1343298 | 1/1974 | United Kingdom . |
| 1404672 | 9/1975 | United Kingdom . |
| 1515506 | 6/1978 | United Kingdom . |
| 1517313 | 7/1978 | United Kingdom . |

(List continued on next page.)

OTHER PUBLICATIONS

Scott, David, "Computerized Paintbox Speeds Electronic Art", Popular Science, pp. 102–104, Jun. 1984.

(List continued on next page.)

Primary Examiner—Tommy P. Chin
Attorney, Agent, or Firm—Cooper & Dunham

[57] ABSTRACT

A video image composition system and method in which the artist can move an insert cut out of a foreground image relative to a background image while continuously observing on the monitor the instantaneous artistic effects of the varying composition, without any need to make an initial decision on exactly where to pin the insert. A soft-edged control image operates on the foreground image to cut the insert. By using a pen and a tablet, the artist moves the control and foreground images as a unit relative to the background image while being able at all times to view the monitor display of the dynamically changing, full composited image. The artist can thus rapidly assess a great number of different composited images before deciding where and how to pin the insert for the final composited image. An additional control image allows the artist to select from the background image a foreground object which always will be in front of the insert from the foreground image. The insert moving around the background image will then appear to pass behind this foreground object. The foreground and/or background images can be displayed as transparent images to give more artistic freedom in the selection on where and how to pin an insert by making it possible to observe not only what is around the insert but also what is behind or in front of an image portion.

31 Claims, 7 Drawing Sheets

U.S. PATENT DOCUMENTS

| | | |
|---|---|---|
| 4,250,522 | 2/1981 | Seki et al. . |
| 4,258,385 | 3/1981 | Greenberg et al. .................. 358/22 |
| 4,286,291 | 8/1981 | Taylor et al. . |
| 4,318,096 | 3/1982 | Thornburg et al. . |
| 4,329,710 | 5/1982 | Taylor . |
| 4,334,245 | 6/1982 | Michael et al. . |
| 4,355,805 | 10/1982 | Baer et al. . |
| 4,357,624 | 11/1982 | Greenberg ........................... 358/22 |
| 4,360,831 | 11/1982 | Kellar . |
| 4,384,338 | 5/1983 | Bennett . |
| 4,418,390 | 11/1983 | Smith et al. . |
| 4,433,330 | 2/1984 | Furjanic . |
| 4,524,421 | 6/1985 | Searby et al. . |

FOREIGN PATENT DOCUMENTS

| | | |
|---|---|---|
| 1522375 | 8/1978 | United Kingdom . |
| 1542415 | 3/1979 | United Kingdom . |
| 1548385 | 7/1979 | United Kingdom . |
| 2032217 | 4/1980 | United Kingdom . |
| 1570773 | 7/1980 | United Kingdom . |
| 1574173 | 9/1980 | United Kingdom . |
| 2055027 | 2/1981 | United Kingdom . |
| 1586169 | 3/1981 | United Kingdom . |
| 2062396 | 5/1981 | United Kingdom . |

OTHER PUBLICATIONS

Wise, J. L. et al., "Display Controller Simplifies Design of Sophisticated Graphics Terminals", Electronics, vol. 54, No. 7, pp. 153–157, Apr. 1981.

Regnier, H. K. et al., "Practical Computer Graphics for Television", Conference: International Broadcasting Convention, Brighton, England, pp. 20–23, Sep. 1980.

Stock, R., "Introduction to Digital Computer Graphics for Video", SMPTE Journal, vol. 90, No. 12, Dec. 1981 presented at 122nd Annual SMPTE Technical Conference, Nov. 9–14, 1980.

Shoup, R. G., "Superpaint: The Digital Animator", Detamation, May 1979.

Appel, A. et al., IBM Technical Disclosure Bulletin, vol. 24, No. 4, pp. 2013–2016, Sep. 1981.

Crow, F. C. et al., Shaded Computer Graphics in the Entertainment Industry, Computer, Mar. 1978, reprinted in Beatty, J. C. et al., Tutorial: Computer Graphics, IEEE Computer Society, IEEE Inc., pp. 483–494, 1982.

Smith, A. R., Tutorial: Computer Graphics, IEEE Computer Society, IEEE Inc., pp. 501–515, 1982.

Crow, F., "Shaded Computer Graphics", IEEE, pp. 483–494, 1978.

Smith, A. R., "Realizable Colors", Technical Memo #9, pp. 1–21, Aug. 27, 1978.

Rawlings, "Chromakey in a Digital System", International Broadcast Engineer, Sep. 1980.

Kajiya, James et al., "A Random Access Video Frame", IEEE Computer Society, Catalog No. 75CH0981–1C, pp. 3–8, May 1975.

Smith, A. R., "TEXAS", Technical Memo #9, pp. 1–13, Jul. 1979.

Kitching, Alan, "Antics—From Stone–Age to Steam Age", The BKSTS Journal, pp. 394–404, Aug. 1980.

Mitchell, A. J., "A Personal History of Video Effects in the BBC", International Broadcast Engineer, pp. 10–14, Sep. 1980.

Hughes, D., "'Ultimatte' Video Travelling Matte", International Broadcast Engineer, pp. 23–25, Sep. 1980.

Reiffle, L. et al., "Telestrator Electronic Graphic Systems", International Broadcast Engineer, pp. 120–122, Jul. 1981.

Kennedy, M. C., Extracts from Digital Video—vol. 2, pp. 68–98, Mar. 1979.

Busby, E. S., Abstract from SPMTE Journal Report on the 13th SMPTE Television Conference, Mar. 1979.

Newell, Martin, "Geometric Representations in Computer Graphics Part II", pp. 1–12.

Blinn, James, "Models of Light Reflection for Computer Synthesized Pictures", pp. 192–198.

Blinn, James, "Geometric Representations in Computer Graphics Part I", pp. 1–18.

Catmull, E., "Sampling, Rastering and Aliasing".

Catmull, E., "A Tutorial on Compensation Tables", pp. 4/7–32, 5/3–18.

Blinn, J., "Simulation of Wrinkled Surfaces", pp. 9/15–20.

VIDEO PROCESSING FOR COMPOSITE IMAGES

This is a continuation of application Ser. No. 761,348, filed Jul. 31, 1985 which in turn is a division of Ser. No. 457,098 filed Jan. 10, 1983 (now U.S. Pat. No. 4,602,286).

BACKGROUND OF THE INVENTION

The invention relates to image composition arrangements. The composition of pictures where one image is keyed into a second picture is known using simple switching techniques.

Unfortunately, the results are not altogether visually satisfactory and the manipulation of such images is limited.

The present invention is concerned with providing an arrangement which allows a more realistic resultant composed image to be provided and which provides greater flexibility than heretofor.

SUMMARY OF THE INVENTION

According to the invention there is provided an image composition system comprising, first input means for providing a first source of picture information, second input means for providing a second source of picture information, means for providing a third source of picture information, processing means for receiving information from both said first and second sources so as to provide the composed picture, and control means for varying the proportions of picture information used by said processing means to provide said composed image in dependence on the information from said third picture source.

Further according to the invention there is provided a method for image composition comprising, receiving a first source of picture information, receiving a second source of picture information, receiving a third source of picture information, processing the information from both said first and second sources by variably controlling the proportions of picture information used in the processing step in dependence on information from said third picture source.

BRIEF DESCRIPTION OF THE DRAWINGS

The first and/or second information sources may comprise a picture source, colour information source or synthetically generated source.

The invention will now be described by way of example with reference to the accompanying drawings, in which.

DESCRIPTION OF PREFERRED EMBODIMENTS

As already discussed use of established composite image generation techniques tend to produce unrealistic results which appear contrived or degraded, this degradation can be more pronounced when the data is in digital format, due to the quantised nature of a digital television picture. To achieve enhanced results the present invention is concerned with manipulating the picture information in such a way that the composed picture is a composite picture from more than one source blended in a manner which visually results in a produced image which is generally indistinguishable from images which were composed originally as a single picture yet allowing manipulation of the composition of this picture to be effected.

Figure 1:
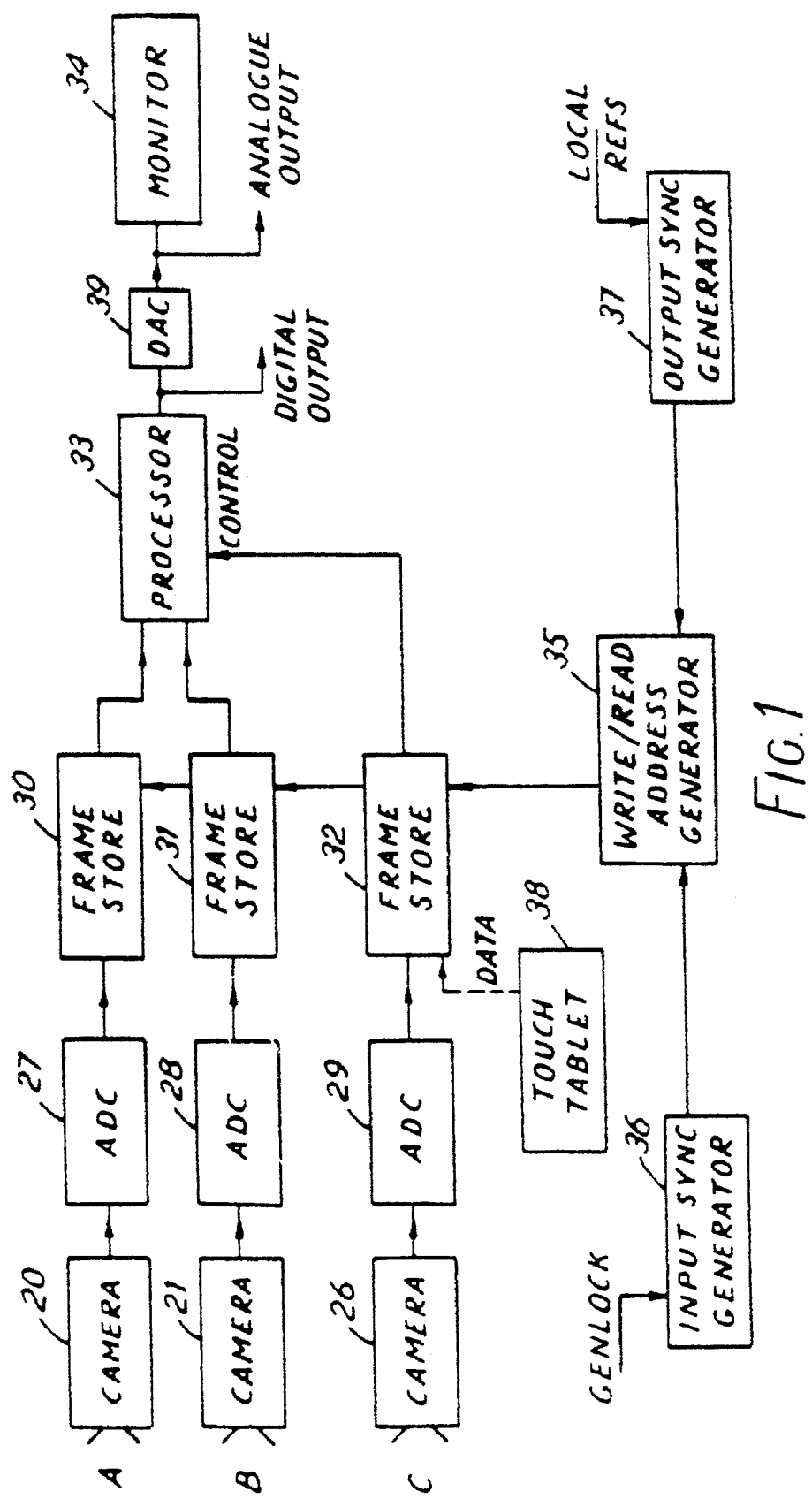
FIG. 1 shows one embodiment of the present invention for composing an image produced from more than one image source.

FIG. 1 shows one embodiment of the system of the present invention for producing the image composition. The first picture source is provided by camera 20 and passes via analogue to digital converter (ADC) 27 to frame store 30.

The second picture source is provided by camera 21 and passes via ADC 28 to framestore 31. The outputs from framestores 30 and 31 are made available to processor 33 described, in more detail below, and the result therefrom is available for display on a monitor 34, via DAC 39 as necessary, or for use elsewhere in analogue or digital form as desired. Thus the composed image from processor 33 can be considered as being comprised of picture information from both original picture sources. The way in which these sources are used within the processor is effectively controlled by a third source of picture information. This is shown as being provided by the additional framestore 32.

This further framestore 32 contains picture shape and blending information for use in controlling the processor 33. This information may have been derived via camera 26 and ADC 29 or touch tablet 38 as explained below and can be considered as a variable stencil for use in composing the picture.

Figure 2:
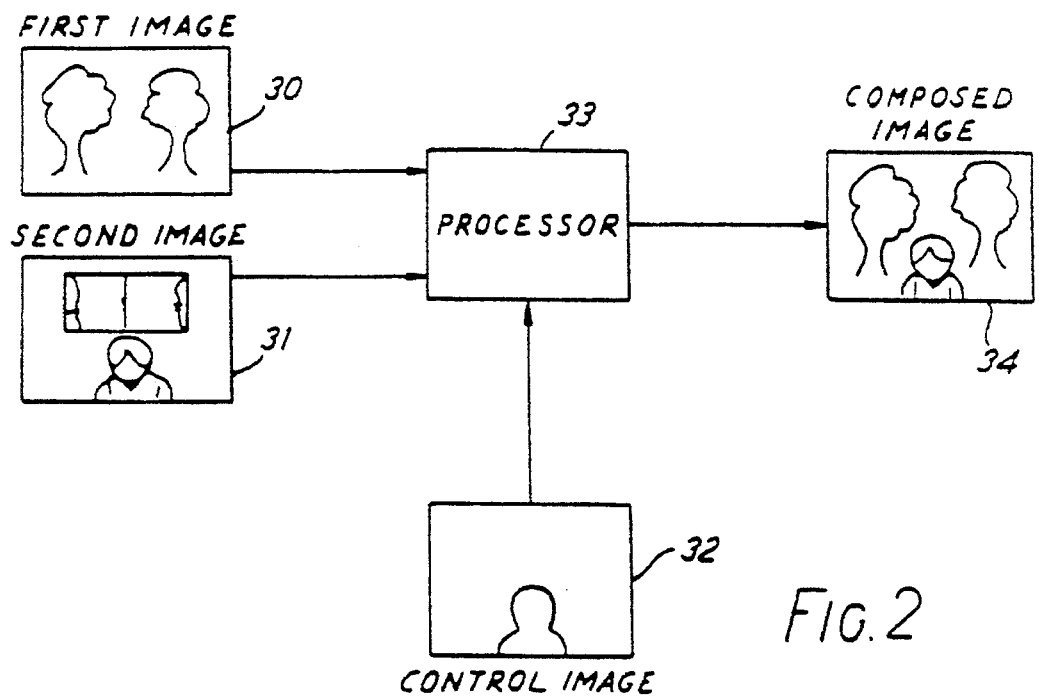
FIG. 2 shows visual representation of the image composition.

The resultant manipulation is exemplified in FIG. 2. The first and second images within framestores 30 and 31 respectively are received by processor 33. The control image from framestore 32 is used to cause the processor to compose the final image from the first image together with that portion of the second image corresponding to the shape of the control image. This allows only selected features from within the second image to be used in the final image. Thus the person can be transposed from the original indoor scene shown into an outdoor scene as shown on monitor 34. In practice the processor is also configured to manipulate the data in such a way that the insert is realistically blended into the picture to appear as if it were there in the original scene. The control image itself is the mechanism which directs this blending operation, using both its shape and instantaneous value as now explained.

Figure 3A:
FIG. 3 shows various parameter values illustrating the blending technique employed in the image composition.
Figure 3B:
Figure 3C:
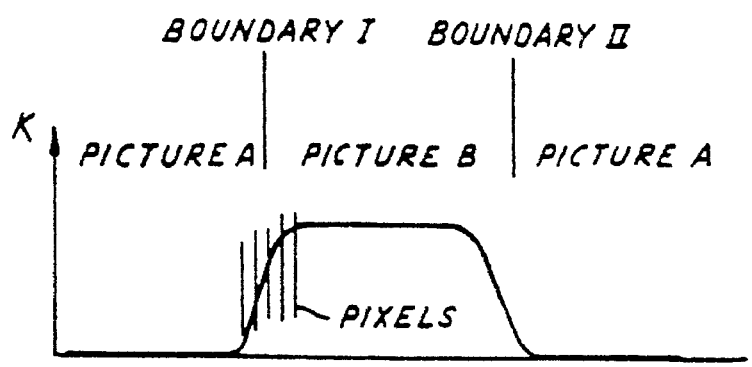
Figure 3D:
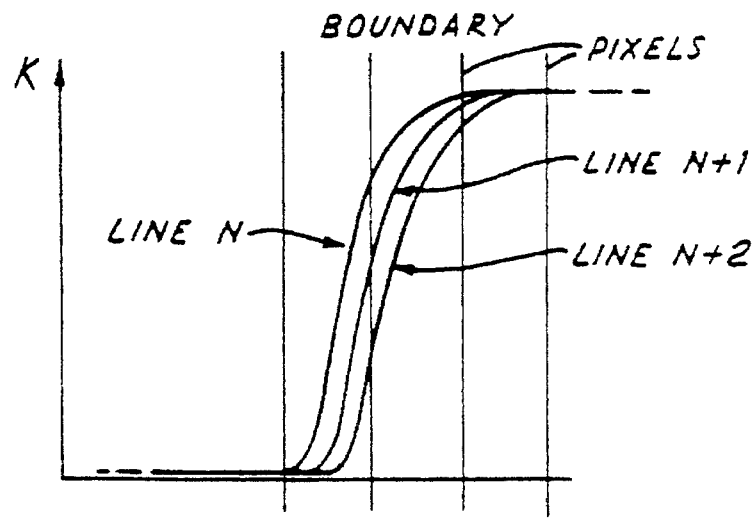

The control image is arranged to effectively define the percentage used from one picture when processed with the other picture, with blending for example adjacent the picture insert interface. This value (K) is shown in the example of FIG. 3c as varying initially from a minimum to a maximum adjacent boundary I and then subsequently decreasing to a minimum adjacent boundary II for that T.V. line. In the FIG. 2 example, this could correspond to a T.V. line towards the bottom of the frame. At the changeover, this technique avoids any sharp edges by providing a gradual increase in picture contribution spaced over one or more picture points. Thus, adjacent the first boundary, a small contribution is made from the picture about to be inserted (picture B) and this increases, with a corresponding decrease in picture A until B completely replaces first picture source A. When the next boundary is approached, the operation repeats, this time in reverse. This technique results in blending of the pictures from the first and second sources in this example only in the marginal regions of their interface. Although the blending described can be considered as along a horizontal line, the same technique is employed vertically. At other parts of the picture the relationship will be different. Since the transition point may be displaced on subsequent scan lines, each line will result in slightly different values of K as exemplified in FIG. 3d. For any parts of the picture where no contribution is required from the second picture source B, then K will be a minimum throughout the horizontal scanning line (see FIG. 3a). Where the insert has a horizontal edge, then adjacent this boundary, a valve of K shown in FIG. 3b could be expected for the relevant scanning line. Adjacent lines would have an increasing value of K until the FIG. 3c situation was reached, thus giving the blending technique vertically as well as horizontally.

The frame stores 30 to 32 share common write/read addressing block 35, which is under the control of the input sync generator 36 and output sync generator 37 in normal manner.

The process within processor 33 required to achieve the blending is given by the equation:

OUTPUT=K×PICTURE 1+(1−K)×PICTURE 2 where K<1.

Figure 4:
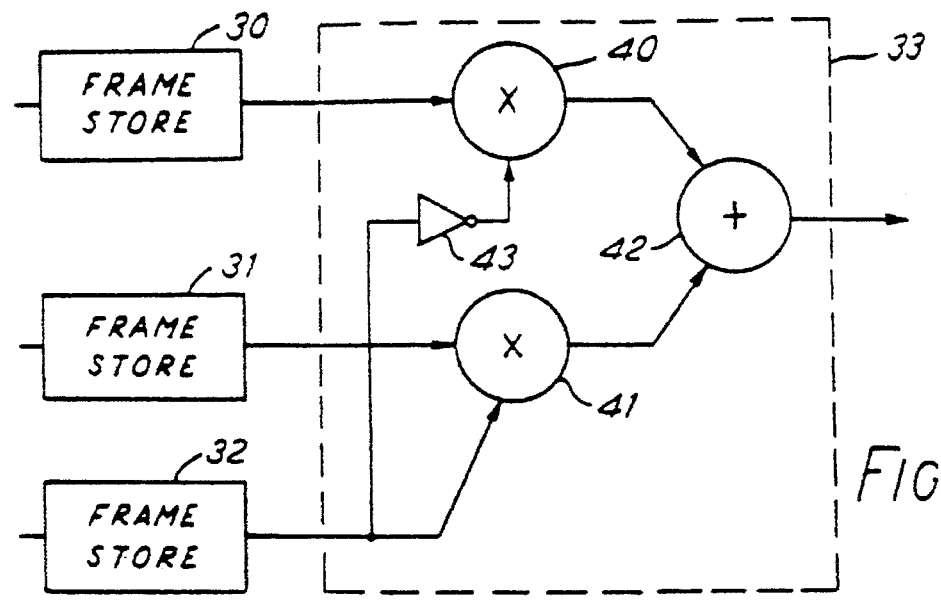
FIG. 4 shows an embodiment of the processor of FIG. 1.

An embodiment for the processor 33 is shogun in FIG. 4. The value of K from control shape store 32 for a given pixel location is received by multiplier 41 and its inverse (1−K) is made available to multiplier 40 via inverter 43 to control the image composition. The outputs from multipliers 40, 41 are received by adder 42, the output of which can be passed to the monitor as described in FIG. 1.

Although the system is shown for simplicity as having single frame stores 30 and 31 for handling monochrome only it can be extended to colour by adding additional memory to these picture framestores and also adding parallel processing circuitry for the colour data.

Although the picture shape with associated values of K for each picture point within the frame for store 32 could be generated synthetically, a preferable way of providing these values is to use a visual shape mechanism. One approach shown in FIG. 1 is to use a camera 26 with its output passed to store 32 via ADC 29. The insert shape can be a profile or silhouette which will in practice cause a slope to be produced in the analague output level from the camera over a number of picture points as in FIG. 3c and thus when digitised and stored as 8 bit words for example will give the variation in K desired for smooth blending in the changeover region.

By providing shapes with intermediate intensity values for K throughout the insert, we have found that special effects such as transparent or translucent images for example can be included in the composed scene.

Figure 9:
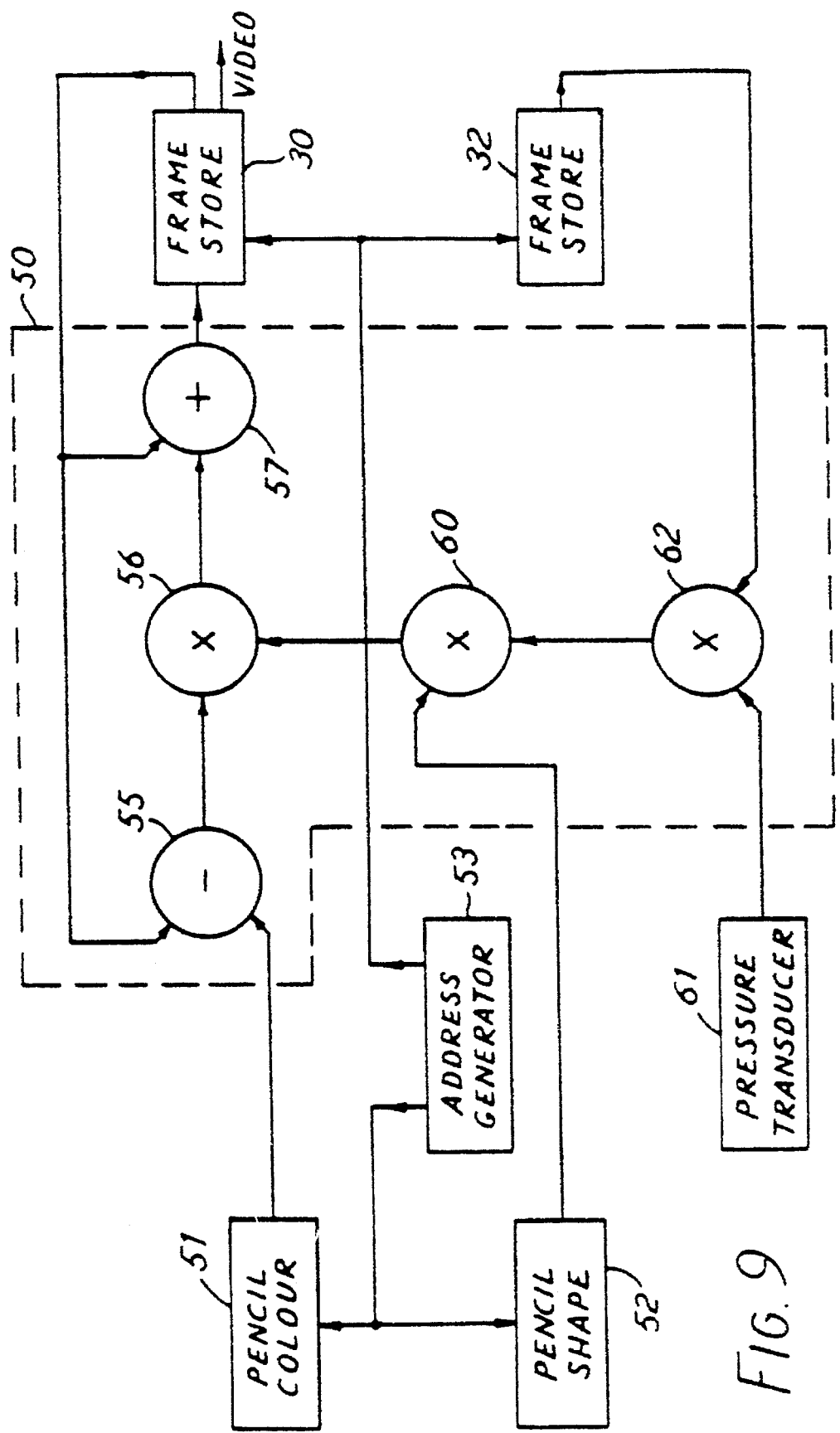
FIG. 9 shows an arrangement for providing a mask to aid picture build up.

By incorporating a high resolution camera or by including filtering techniques, the number of pixels involved at changeover (horizontally and vertically) and thus the gradient of the slope can be varied. Another approach shown in FIG. 1 is to use a touch tablet 38 or other manually operable device to provide the desired insert shape and use this as the K data input to the store 32 using techniques extending from these described in UK Patent Publication No. 2089625 for example, as described with reference to FIG. 9 below.

Although the picture inputs to the stores 30 and 31 have been described as coming from cameras, the system is flexible enough to allow other picture sources to be used. One specific aspect is to compose a picture containing graphic information In this case store 30 can provide the background information (luminance or colour) and the graphic shape can be input to store 32 as before. These shapes could be derived from any suitable source but for realism the manner described in FIG. 9 below is preferable. The shape could be a straight line, circle, alpha/numeric or other character if desired. In the present situation the store 31 could merely contain a fixed (or variable) colour or intensity which would be selected dependent on shape defined by store 32.

Now wherever the store 32 gives a value of zero then the output from framestore 30 will be passed to the monitor 34 without modification, but when the store 32 output equals one then the colour as defined by the store 31 will appear on the monitor. For values between nought and one a proportion of mix of colour value and framestore 30 output will be applied to the monitor.

Where the system is used in conjunction with the image creation system mentioned above the picture visible on the monitor directly simulates the effect which the artist will achieve on his picture when he finally decides to commit these lines and other graphic representations to his picture, or alternatively can use these lines as a guide line as the picture is created.

Although the FIG. 1 arrangements is shown with common addressing for framestores 30–32, so that there is a fixed pixel relationship between the images stores therein, an additional benefit can be achieved as now described with reference to FIG. 5 to allow a changeable pixel relationship with additional manipulation so that, whilst retaining the original picture information, is is possible to move the location, size or orientation of the insert into the composed picture.

Figure 5:
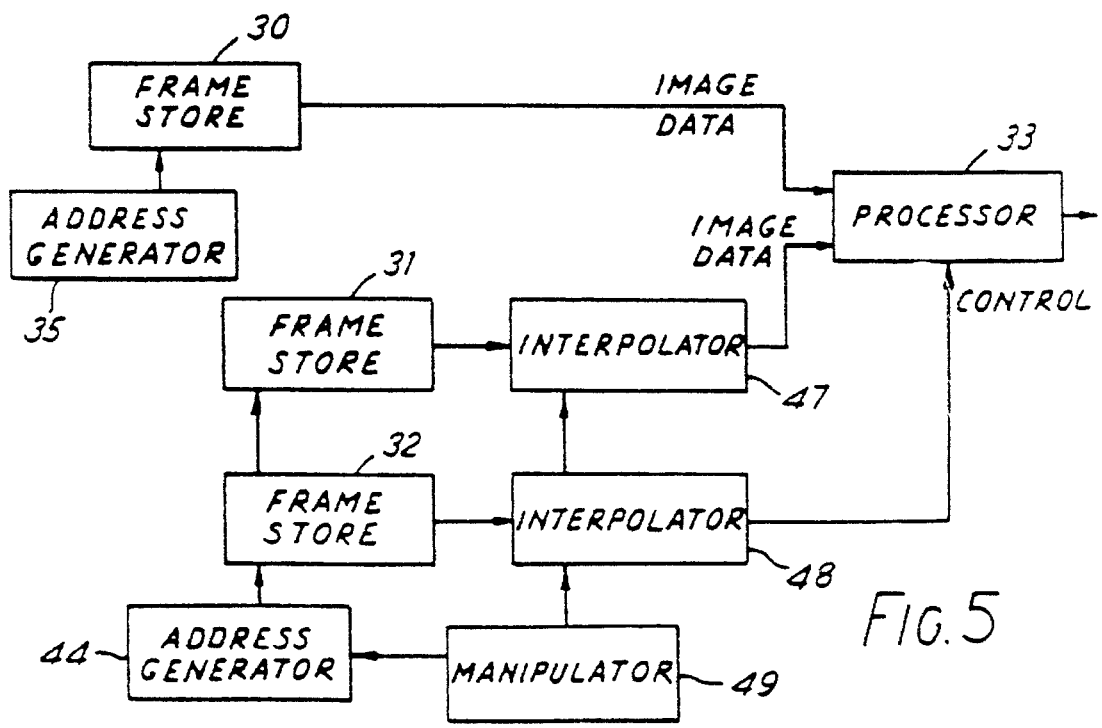
FIG. 5 shows additional manipulation components.

The FIG. 5 arrangement is concerned with the manipulation of information from the framestores and for simplicity only the relevant blocks are included The input and output arrangements would be as in FIG. 1. The address generator 35 is now used only with the first picture framestore 30. An additional address generator 44 is provided for use by both the second picture framestore 31 and the control shape image framestore 32. The outputs from framestores 31 and 32 now pass via interpolators 47 and 48 prior to receipt by processor 33. The read addressing of the framestores and the control of the interpolators is effected by manipulator 49 to give the required address selection and pixel interpolation to achieve the size change or orientation desired for example. The. mechanisms for interpolation and address manipulation are known in the art see also U.S. Pat. No. 4,163,249 for example. Because the addressing block 44 is common to framestores 31 and 32 the pixel relationship is maintained. This ensures that the manipulation of the control image shape is duplicated for the image within framestore 31. Thus, considering the images represented in FIG. 2, the control image can be manipulated so that it can be shrunk for example and the person in the second image will shrink also and be inserted in the picture at reduced size. Rotation manipulation of the control shape will cause the person to lie down in the final image for example.

The requirement to produce a new shape representation each time is removed. Manual control of the position, size or orientation can be achieved using trackerball or joystock for example in usual manner.

Where there is a requirement to only move the control image location an alternative system can be used without employing interpolation as now described.

An example of the use of this technique is for 'cut and paste'. An artist often find that he is painting the same pictures over again and it would greatly assist him if he could have a means of taking part of the previously drawn picture and pasting this into his new picture.

Figure 6:
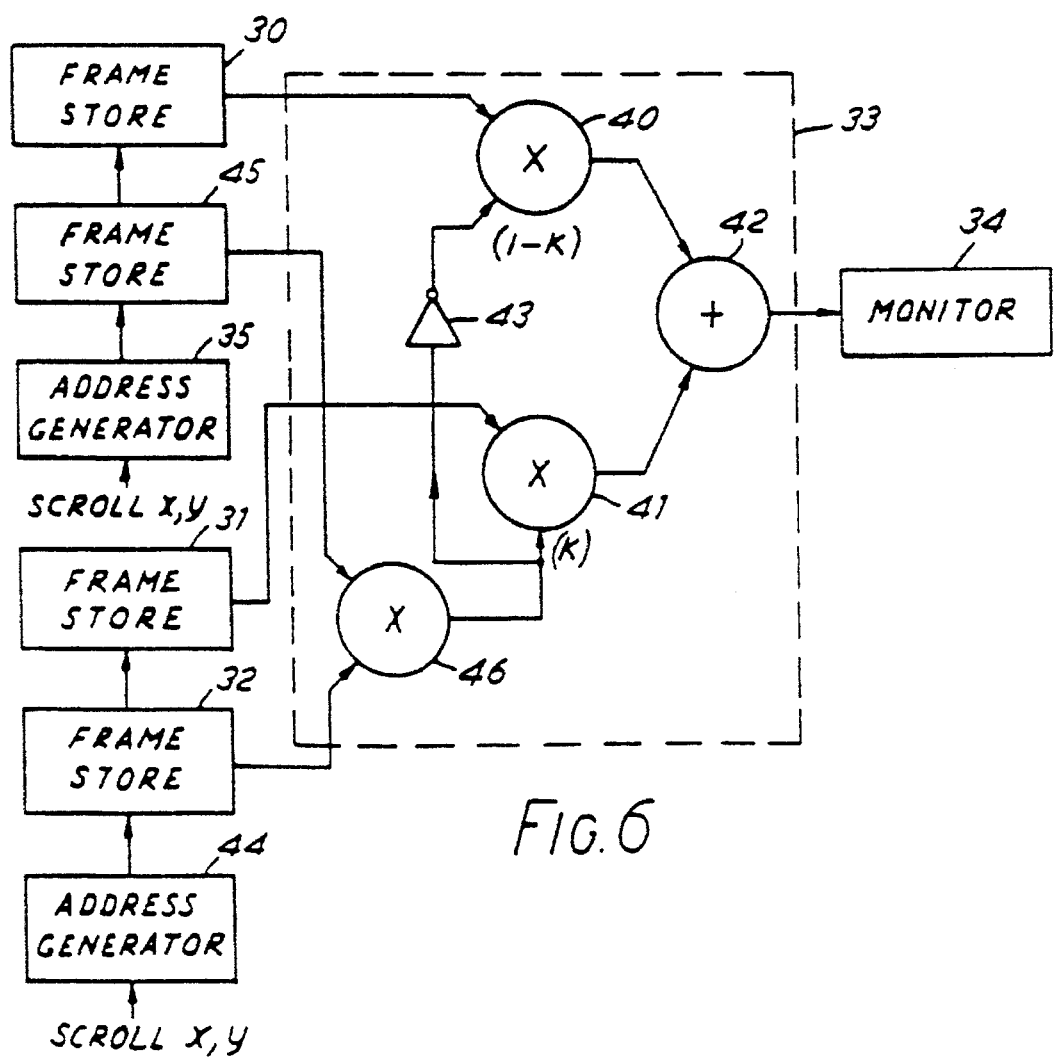
FIG. 6 shows an arrangement allotting the capability of moving the inserted picture.

Prior to pasting together his pictures the artist may require that the picture to be pasted can be moved around the original screen and viewed as if it existed in that picture but without finally committing it to the picture, this can be achieved using a system as shown in FIG. 6. The picture framestores 30, 31 each has its own address generator 35, 44 which can be independently controlled. If the start address of generator 44 is varied, while the start address of address generator 35 is kept at 0.0, then using the shape as defined in store 32, the picture cut from picture B can be made to move around the picture A until its desired placement is found. This movement can be controlled by joystick, tracker ball or other means.

In addition a further shape store 45 is provided as a refinement to allow a foreground object to be defined in picture A. This store 45 is also driven by address generator 35. This store contains the shape or blending information which defines the foreground object in picture A. The processor 33 has been modified to include a further multiplier 46 to cope with the additional manipulation. To produce the correct K factor for the processor the outputs from stores 45 and 32 are first multiplied together before being applied to the processor as previously described. The result as far as the artist or operator is concerned will be that as he moves his cut picture from picture B around picture A then it will seem to disappear behind the objects in picture A which are defined as being foreground.

The system is shown with the capability of scrolling both or either picture A or B using addressing blocks 35 or 44.

The common address generator 35 for stores 30 and 45 and the common address generator 44 for stores 31 and 32 ensures that correct picture relationships are maintained.

The ability to move and insert parts of the picture make the system ideal for providing animation. An image of an animal or parts thereof can be inserted and moved across the screen and if a separate cut out shape of the legs are stored then these can be manipulated and captured frame by frame under joystick control for example to simulate a walking movement whilst the animal tranverses the picture.

Alternatively, the positions can be generated under computer control, where a range of repetitive movements can be made available and so create simply and less tediously animation effects.

Figure 7:
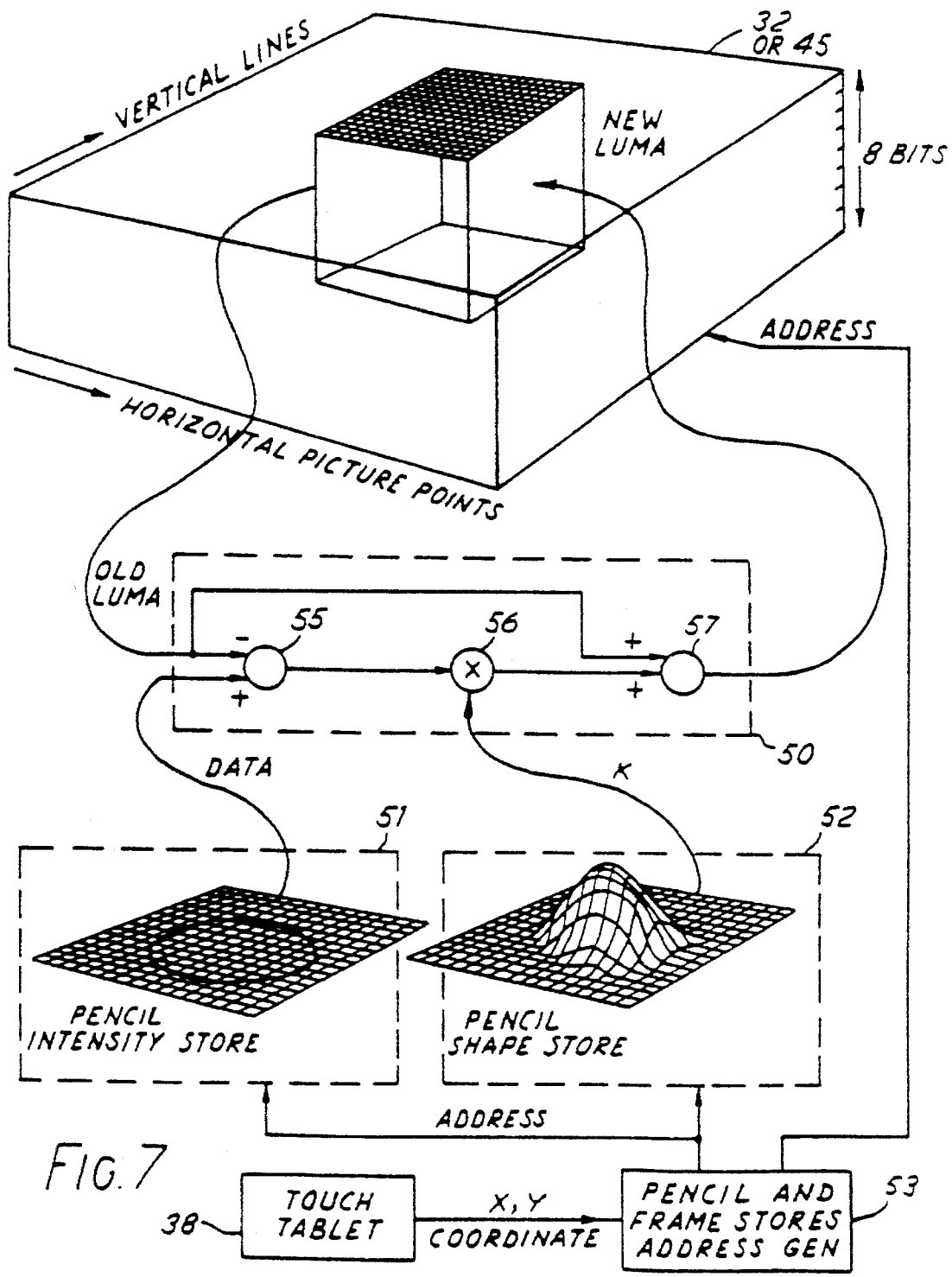
FIG. 7 shows an arrangement for artificially generating the insert shape.

As already mentioned a touch tablet 38 or its equivalent can be used to enter the desired shape information into stores 32 or 45. In order to produce the blending effect desired, our research has shown that this can be provided by utilizing techniques derived from modified arrangements to those disclosed in UK Patent Publication No. 2089625. Thus the touch tablet 38 of FIG. 1 is in practice used with additional system elements to provide the desired painting or drawing techniques as now described in detail in FIG. 7.

The co-ordinates from the touch tablet 38 are received by an address generator 53 which provides addressing for the frame store 32 so as to correctly enter the data into the store locations. The frame store could alternatively be store 45 of FIG. 6. The address generator controls the frame store to allow a 'read-modify-write' sequence to occur, the modification taking place in processor 50. The address generator 53 also controls the stores 51 and 52 which have a size corresponding to a designated number of picture points in a patch. The pencil intensity (or colour) and pencil shape provided by stores 51 and 52 are an ideal way of providing the insert shape as the artist or operator can draw around the object of interest and then fill in the space inside the outline. Because of the pencil shape being of the type that falls away at the edges, this will also cause the desired blending effect as now described.

A patch of 16×16 pixels is shown as being large enough to encompass the desired pen shape in this example. The peak of the pen shape is central of the of the patch in this instance and will produce the maximum value of K at this point. The x and y coordinate provided by the touch tablet will correspond to the corner of the patch read out from the store and processing of all points within this patch is effected in processor 50 and the modified data written back into the store 32 (or 45). During this processing the old luminance value and the designated intensity value are subtracted in subtractor 55 and the difference multiplied by coefficient K in multiplier 56, the value of K being dependent on where the particular picture point lies within the selected patch. The result is added to the earlier luminance data by adder 57. It is clear that some picture points at the periphery will remain unchanged in this example. Movement of the actual stylus on the touch pad by one picture point will cause a new patch to be read out from the store 32 which will contain most of the earlier picture points but 16 new picture will be present and naturally 16 others will have been omitted. The processing will again be carried out for the entire patch. It can be seen that during the second processing operation just described, the previous movement by 1 picture point will cause a proportion of the luminance information generated by the earlier processing operation to be used in the calculation of the new content for the updated patch.

The number of processing steps for a given coordinate will depend on the size of the patch accessed.

Thus, if the patch was say 32 picture points wide and 32 high there are 32×32 or 1024 points to be processed for each movement of the stylus.

In this way, the insert shape is built up. At the edges the intensity will automatically fade away, allocating the blending effect to be achieved as the desired value of K will have been provided and entered into stores 32 or 45 during this operation. Shapes drawn with variable intensity other than at the boundary will cause variable blending elsewhere. The operator can view this shape during or after generation by feeding the data from the relevant store to the monitor 34, or by considering it as a graphic input and superimposing it on the original picture as described above.

Figure 8:
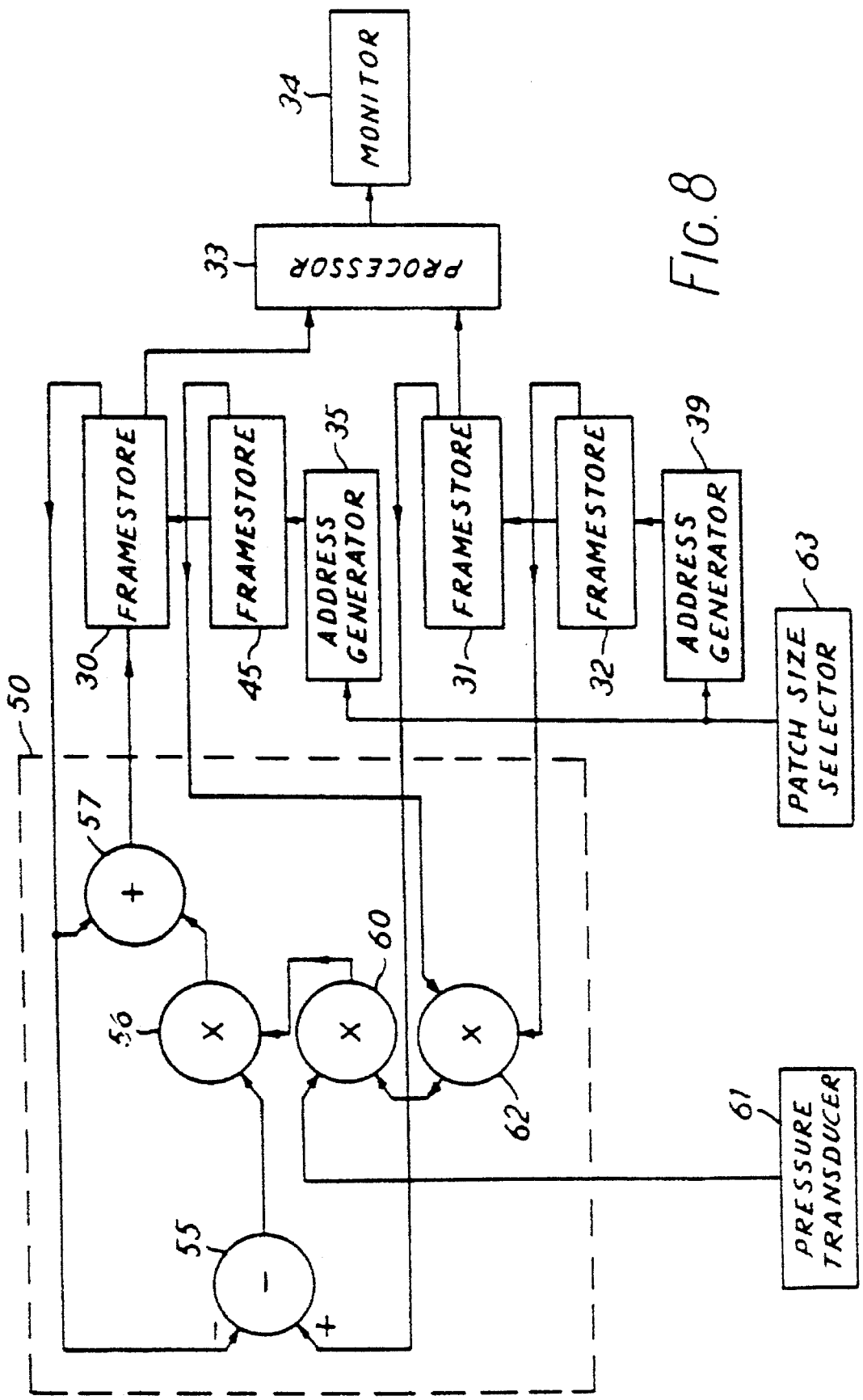
FIG. 8 shows an arrangement allotting the insert to be transferred to the original picture.

Once the operator or artist has decided where he requires his cut picture to be placed then there is a need for actually transferring the cut picture from picture B to picture A. Once again, the cut picture must be blended in properly when interfaced to the original picture and this can be achieved using the arrangement shown in FIG. 8. In this case, however, instead of the pencil colour and pencil shape together with framestore 32 output being applied to the processor 50 as in FIG. 7, the framestore 31 plus its insert shape as defined by store 32 are applied to the processor in place of the pencil or the implement.

As for the video path this processing path also requires that framestore 30 and framestore 31 have separate address generators 35, 39 as they have to be accessed from different addresses for a particular process. To achieve the foreground/background effect then the outputs from the stores 32 and 45 are multiplied in an additional multiplier 62 before being received by the other elements of the processor. A further multiplier 60 is provided which acts as an input for pressure provided from transducer 61 thus allotting the information from framestore 31 to be only partially applied onto the framestore 30 information if so desired.

A dedicated processor is required for block 50 in order to achieve reasonable processing speed. A full framestore of 584×768 pixels takes about 0.6 of a second to be pasted into the first framestore 30. Since in many cases the object to be cut from framestore 31 does not occupy the whole of this framestore then a saving in time can be made by only accessing a rectangle which is sufficient to enclose the object to be cut. This patch size can be controlled by a patch size selector 63 as shown which in turn controls the implementing of the two address generators in practice this patch size generator could incorporate a similar addressing mechanism to that used for the address generation within block 53 of FIG. 7 and described in more detail in the aforementioned patent application.

The output provided by this processing is given by the following:

$$\begin{aligned} \text{OUTPUT} &= (1-K_1)FS_1 + K_1[K_2FS_2 + (1-K_2)FS_1] \\ &= [(1-K_1) + (K_1 - K_1K_2)]FS_1 + K_1K_2FS_2 \\ &= (1-K_1K_2)FS_1 + K_1K_2FS_2 \end{aligned}$$

where
$K_1$ is the output provided by store 45
$K_2$ is the output provided by store 32
$FS_1$ is the output provided by store 30
$FS_2$ is the output provided by store 31.

Although the control image shape and intensity has been described as being generated in a single operation, in practice the shape can be first defined and the intensity or colour built up subsequently. This allows special effects mentioned above to be readily altered by the operator.

From the artistic point of view this is similar to applying a form of masking tape or stencil to the picture so defining the area within which the artist requires his paint applied to the paper. This is of particular use when using an airbrush but may also be used for any other painting media. This arrangement now described provides a means of producing the equivalent of painting mask electronically as FIG. 9. The processor is similar to that of FIGS. 7 and 8 and the system includes the store 32 which is driven in parallel with the framestore 30. When the pencil colour (or intensity), pencil shape and framestore value are read out an additional value is read out from the store 32 which defines the mask. This is multiplied in multiplier 62 by the pressure from the stylus via transducer 61 before the further processor steps. Thus the store 32 modulates the pressure such that when the mask is one the pressure is allowed through and there is no effect upon the painting but when the mask is zero then the pressure turned to zero and no painting will appear on the framestore. Since the mask can have any value between nought and one a shape can be applied to it which will define the exact shape in which the artist requires his paint to be applied.

Once again, the mask provides a blend of the required paint to the original picture and so producing a very natural effect.

Thus the various embodiments described allow a composite picture to be generated front normal picture sources or by synthesis, which retains its realism by removing sharp edges from the interfaces and allowing additional manipulation such as relative movement to be provided, under the control of the image shape.

We claim:

1. An image composition system comprising:

a first input for first digital video image signals representing a first video image;

first frame store means for storing a frame of said first digital video image signals;

a second input for second digital video image signals representing a second video image;

second frame store means for storing a frame of said second digital video image signals;

a third input for third digital video image signals representing a first control image;

third frame store means for storing a frame of said third digital video image signals;

said third frame store means storing third digital video image signals having a first value for pixels of a composed image consisting of said first or said second digital video image signals output from one of said first and second frame store means, a second value for pixels of said composed image consisting of said first or of said second digital video image signals output from the other of said first and second frame store means, and respective intermediate values for pixels of the composed image consisting of respective proportions of the first and second digital video image signals output from said first and second frame store means;

addressing means for writing and reading said first, second and third digital video image signals into and from selected addresses of the respective frame store means, said addressing means maintaining upon said reading a desired pixel relationship between said third digital video image signals representing said first control image and said second digital video image signals representing said second video image; and processor means for forming a composed image by:
  (i) selectively outputting the first or the second digital video image signals read from one or from the other of said first and second frame store means when the third digital video image signals representing said first control image have respectively one or the other of said first and second values; and
  (ii) combining and outputting the first and the second digital video image signals from said first and from said second frame store means in proportions dependent upon the values of the third digital video image signals representing said first control image when said third digital video image signals have said intermediate values;

wherein said addressing means modify the spatial relationship of the second video image and the first control image represented by the second and third digital video image signals input at said second and third inputs relative to the first video image represented by the first digital video image signals input at said first input to cause said composed image formed by said processor means to show a smooth movement of a portion of said second video image defined by said first control image relative to said first video image due to said modifying of said spatial relationship by said addressing means, before a selection of said spatial relationship for storage of the composed image corresponding to said selection.

2. An image composition system according to claim 1, wherein said addressing means include means for varying the order of the respective first, second and third digital video image signals as between frame store input and output of said first, second and third frame store means.

3. An image composition system according to claim 2, comprising operator controlled graphics means arranged to provide the third digital video image signals representing said first control image to said third input, wherein said graphics means includes a manually operable coordinate selecting means, an implement intensity or color store, and an implement shape store, said addressing means comprising means for receiving coordinates from said coordinate selecting means and for causing the reading of said third digital video image signals from a patch of addresses in said third frame store means determined by the coordinates received from said coordinate selecting means and for controlling said intensity or color store and said shape store to provide for each of said third digital video image signals read from said third frame store means an intensity or color signal and a shape signal respectively, said processing means including means for receiving said intensity or color signal and the respective third digital video image signals and for combining said intensity or color signal and the respective third digital video image signals in proportions determined by said shape signals to derive a resultant digital signal and means for entering said resultant digital signal at the respective address in said third frame store means to build up said first control image and wherein said shape store provides signals defining an implement shape which falls away at the edge so that the third digital video image signals at a boundary of said first control image decline over a distance of a few image points from one value to another.

4. An image composition system as in claim 3, comprising:

a fourth input for fourth digital video image signals representing a second control image;

a fourth frame store means for storing a frame of said fourth digital video image signals representing said second control image;

said fourth frame store means storing fourth digital video signals having a first value for pixels of the composed image consisting of the digital video signals from the other one of said first and second frame store means irrespective of the value of the respective third digital video signals from said third frame store means, and said fourth digital video signals having a second value when the third digital image signals from said third frame store means are to be effective, said processor means being responsive to the third and fourth digital video signals from said third and fourth frame store means to give preference to said second control image when the respective fourth digital video signals from said fourth frame store means have said first value.

5. An image composition system according to claim 3, comprising a monitor for displaying said first control image during or after said building up thereof.

6. An image composition system as in claim 5, comprising:

a fourth input for fourth digital video image signals representing a second control image;

a fourth frame store means for storing a frame of said fourth digital video image signals representing said second control image;

said fourth frame store means storing fourth digital video image signals having a first value for pixels of the composed image consisting of digital video image signals from the other one of said first and second frame store means irrespective of the value of the respective third digital video image signals from said third frame store means, and said fourth digital video image signals having a second value when the third digital video image signals from said third frame store means are to be effective, said processor means being responsive to the third and fourth digital video image signals from said third and fourth frame store means to give preference to said second control image when the respective fourth digital video image signals from said fourth frame store means have said first value.

7. An image composition system as in claim 3, comprising means for superimposing said first control image on said second video image.

8. An image composition system as in claim 7, comprising:

a fourth input for fourth digital video image signals representing a second control image;

a fourth frame store means for storing a frame of said fourth digital video image signals representing said second control image;

said fourth frame store means storing signals having a first value for pixels of the composed image consisting of digital video image signals from the other one of said first and second frame store means irrespective of the value of the respective third digital video image signals from said third frame store means, and said fourth digital image signals having a second value when the third digital image signals from said third frame store means are to be effective, said processor means being responsive to the third and fourth digital video image signals from said third and fourth frame store means to give preference to said second control image when the respective fourth digital video image signals from said fourth frame store means have said first value.

9. An image composition system as in claim 2, comprising:

a fourth input for fourth digital video image signals representing a second control image;

a fourth frame store means for storing a frame of said fourth digital video image signals representing said second control image;

said fourth frame store means storing fourth digital video image signals having a first value for pixels of the composed image consisting of signals from the other one of said first and second frame store means irrespective of the value of the respective third digital video image signals from said third frame store means, and said fourth digital video image signals having a second value when the third digital video image signals from said third frame store means are to be effective, said processor means being responsive to the third and fourth digital video image signals from said third and fourth frame store means to give preference to said second control image when the respective fourth digital video image signals from said fourth frame store means have said first value.

10. An image composition system as in claim 1, comprising:

a fourth input for fourth digital video image signals representing a second control image;

a fourth frame store means for storing a frame of said fourth digital video image signals representing said second control image;

said fourth frame store means storing fourth digital video image signals having a first value for pixels of the composed image consisting of signals from the other one of said first and second frame store means irrespective of the value of the respective third digital video image signals from said third frame store means, and said fourth digital video image signals having a second value when the third digital video image signals from said third frame store means are to be effective, said processor means being responsive to the third and fourth digital video image signals from said third and fourth frame store means to give preference to said second control image when the respective fourth digital video image signals from said fourth frame store means have said first value.

11. An image composition system according to claim 1, comprising operator controlled graphics means arranged to provide the third digital video image signals representing said first control image to said third input, wherein said graphics means includes a manually operable coordinate selecting means, an implement intensity or color store, and an implement shape store, said addressing means comprising means for receiving coordinates from said coordinate selecting means and for causing the reading of said third digital video image signals from a patch of addresses in said third frame store means determined by the coordinates received from said coordinate selecting means and for controlling said intensity or color store and said shape store to provide for each of said third digital video image signals read from said third frame store means an intensity or color signal and a shape signal respectively, said processing means including means for receiving said intensity or color signal and the respective third digital video image signals and for combining said intensity or color signal and the respective third digital video image signals in proportions determined by said shape signals to derive a resultant digital signal and means for entering said resultant digital signal at the respective address in said third frame store means to build up said first control image and wherein said shape store provides signals defining an implement shape which falls away at the edge so that the digital signals at a boundary of said first control image decline over a distance of a few image points from one value to another.

12. An image composition system as in claim 11, comprising:
   a fourth input for fourth digital video image signals representing a second control image;
   a fourth frame store means for storing a frame of said fourth digital video image signals representing said second control image;
   said fourth frame store means storing fourth digital video image signals having a first value for pixels of the composed image consisting of the digital video image signals from the other one of said first and second frame store means irrespective of the value of the respective third digital video image signals from said third frame store means, said fourth digital video image signals having a second value when the third digital video image signals from said third frame store means are to be effective, said processor means being responsive to the third and fourth digital video image signals from said third and fourth frame store means to give preference to said second control image when the respective fourth digital video image signals from said fourth frame store means have said first value.

13. An image composition system according to claim 11, comprising a monitor for displaying said first control image during or after said building up thereof.

14. An image composition system as in claim 13, comprising:
   a fourth input for fourth digital video image signals representing a second control image;
   a fourth frame store means for storing a frame of said fourth digital video image signals representing said second control image;
   said fourth frame store means storing fourth digital video image signals having a first value for pixels of the composed image consisting of digital video image signals from the other one of said first and second frame store means irrespective of the value of the respective third digital video image signals from said third frame store means, said fourth digital video image signals having a second value when the third digital video image signals from said third frame store means are to be effective, said processor means being responsive to the digital video image signals from said third and fourth frame store means to give preference to said second control image when the respective fourth digital video image signals from said fourth frame store means have said first value.

15. An image composition system as in claim 11, comprising means for superimposing said first control image on said second video image.

16. An image composition system as in claim 15, comprising:
   a fourth input for fourth digital video image signals representing a second control image;
   a fourth frame store means for storing a frame of said fourth digital video image signals representing said second control image;
   said fourth frame store means storing fourth digital video image signals having a first value for pixels of the composed image consisting of digital video image signals from the other one of said first and second frame store means irrespective of the value of the respective third digital video image signals from said third frame store means, said fourth digital video image signals having a second value when the third digital video image signals from said third frame store means are to be effective, said processor means being responsive to the digital video image signals from said third and fourth frame store means to give preference to said second control image when the respective fourth digital video image signals from said fourth frame store means have said first value.

17. An image composition system as in claim 1 including a painting circuit which comprises a manually operable pen and a tablet and generates position signals indicative of respective designated positions of the pen relative to the tablet and brush signals indicative of a parameter for respective groups of pixels at areas which are positionally related to said designated pen positions, said painting circuit being coupled with said addressing means and said processor means to selectively modify a selected one of said first and second video images and said first control image at positions thereof functionally related to said position signals and in a manner functionally related to said brush signals.

18. An image composition system as in claim 17 in which said painting circuit includes circuits coupled to said first, second and third frame store means to select any one of said first and second video images and said first control image for modification in accordance with said position and brush signals.

19. An image composition system as in claim 17 wherein said painting circuit comprises circuits causing said brush signals to change substantially smoothly for at least a selected distance from the periphery toward the center of areas corresponding to respective ones of said designated pen positions.

20. A system comprising:

a first input for first digital signals representing pixels forming a first image;

a first framestore for storing a frame of said first digital signals;

a second input for second digital signals representing pixels forming a second image;

a second framestore for storing a frame of said second digital signals;

a third input for first control digital signals representing pixels forming a first control image;

a third framestore for storing a frame of said first control signals;

said third framestore storing first control signals having a first value for pixels of a composed image based on spatially corresponding first digital signals output from said first framestore, a second value for pixels of said composed image based on spatially corresponding second digital signals output from said second framestore, and intermediate values for pixels of the composed image based on combining proportions of spatially corresponding first and second digital signals in proportions dependent on said intermediate values;

address generator circuits coupled with said first, second and third framestores to write and read said first and second digital signals and said first control signals into and from selected addresses of the respective framestores, said address generator circuits maintaining a selected spatial relationship between said second image and said first control image upon reading said second digital signals and said first control signal from the respective framestores; and a processor coupled with said first, second and third framestores to receive said first and second digital signals and said first control Signals read out therefrom and to generate therefrom composed image signals representing pixels of Said composed image where: (a) for pixels of said composed image corresponding spatially to said first control signals which have said first value, said composed image signals are based on spatially corresponding first digital signals; (b) for pixels of said composed image corresponding spatially to said first control signals which have said second value, said composed image signals are based on spatially corresponding second digital signals; and (c) for pixels of said composed image corresponding spatially to said first control signals which have said intermediate values, said composed image signals are based on combining spatially corresponding first digital signals and second digital signals in proportions dependent on spatially corresponding ones of said intermediate values;

a monitor coupled to said processor to receive therefrom said composed image signals and display said composed image represented by said composed image signals; and a manually controlled circuit coupled with said address generator circuits to smoothly modify the spatial relationship between said second image and said first control image on the one hand and said first image on the other hand and to cause said monitor to display a corresponding smooth change in said composed image;

whereby at least a portion of the second image from the second framestore can be defined by the first control image and moved progressively relative to the first image from the first framestore by selective manual operation of said manually controlled circuit while observing on the monitor the composed image which changes smoothly to show the movement of the defined portion of the second image relative to the first image.

21. A system according to claim 20, in which said address generator circuits comprise addressing circuits controllable to vary the order of reading said first and second digital signals and said first control signals into and from the respective framestores as between framestore input and output.

22. A system according to claim 20, including a graphics input unit providing said first control signals representing said first control image to said third input, said graphics input unit comprising a manually operable pen and a tablet for selecting image coordinates, an implement intensity or color store, and a shape source for providing an implement shape parameter, a graphics input unit address generator circuits coupled for receiving the selected image coordinates and for reading said first control signals from a patch of addresses in said third framestore determined by the received selected coordinates and controlling said intensity or color store and said shape source to provide for each first control signal read from said third framestore an intensity or color signal and a shape signal respectively, a brush processor receiving said intensity or color signal and the respective digital signal, said brush processor including a combining circuit combining said intensity or color signal and the respective first control signal in proportions determined by said shape signals to derive a resultant digital signal and a circuit entering said resultant digital signal at the respective address in said third framestore to build up said first control image and wherein said shape source provides signals defining an implement shape which falls away at the edge thereof so that the first control signals at a boundary of said first control image decline over a distance of a few pixels from one value to another.

23. An image composition system as in claim 20, comprising:

a fourth input for second control signals representing pixels forming a second control image;

a fourth framestore for storing a frame of said second control signals;

said fourth framestore storing signals having a first value for pixels of the composed image based on said second digital signals from said second framestore irrespective of the value of the respective first control signals from said third framestore, and a second value when the first control signals from said third framestore are to be effective, said processor being responsive to the first and the second control signals from said third and fourth framestores to give preference to said second control image when the respective second control signals from said fourth framestore have said first value.

24. A system as in claim 23, in which said composed signals representing the composed image are related to the first and second images and the first and second control images according to the expression:

$$P_c = (1-K_1 K_2)P_1 + K_1 K_2 P_2$$

where $P_c$ is the value of a pixel of the composed image, $P_1$ and $P_2$ are the values of positionally related pixels of the first and second images respectively, and $K_1$ and $K_2$ are the values of positionally related pixels of the first and second control images respectively.

25. A system as in claim 22, comprising a circuit coupled to the second and third framestores to receive therefrom and superimpose on each other said second image and said first control image.

26. A method comprising:

providing first digital signals representing pixels forming a first image;

storing a frame of said first digital signals in a first addressable memory portion;

providing second digital signals representing pixels forming a second image;

storing a frame of said second digital signals in a second addressable memory portion;

providing first control signals representing pixels forming a first control image;

storing a frame of said first control signals in a third addressable memory portion;

said first control signals having a first value for pixels of a composed image based on one of said first or said second digital signals, a second value for pixels of said composed image based on the other of said first and second digital signals, and intermediate values for pixels of the composed image based on combining proportions of said first and said second digital signals in dependence on said intermediate values;

writing and reading said first and said second digital signals and said first control signals into and from selected addresses of the respective memory portions to maintain upon reading a desired spatial relationship between pixels represented by said second digital signals and said first control signals; and forming composed image signals representing the pixels of said composed image by selectively outputting: (a) first or second digital signals read from said first or from said second memory portions when said first control signals read from said third memory portion have respectively one or the other of said first and second values; and (b) combining said first and said second digital signals read from said first and second memory portions in proportions dependent upon the values of said first control signals read from said third memory portion when said first control signals have said intermediate values;

displaying said composed image; and providing a manual input controlling said addressing to cause the spatial relationship between said second image and said first control image on the one hand and said second image on the other hand to be selectively modified smoothly while said composed image is being displayed to show a resulting smooth change in the displayed composed image;

whereby at least a portion of the second image can be defined by the first control image and moved smoothly relative to the first image by selective manual control of the addressing while observing on the monitor said composed image undergoing a smooth spatial change to reflect said movement of the defined portion of the second image relative to the first image.

27. A method according to claim 26, comprising:

providing second control signals representing pixels forming a second control image;

storing a frame of said second control signals in a fourth addressable memory portion;

said second control signals having a first value for pixels of the composed image based on said first or on said second digital signals read from the other one of said first and second memory portions irrespective of the value of the respective first control signals read from said third memory portion, and have a second value when the first control signals read from said third memory are to be effective, said step of forming said composed image signals being responsive to the first and the second control signals read from said third and from said fourth memory portions to give preference to said second control image when the respective second control signals from said fourth memory have said first value.

28. A method comprising:

providing first pixel signals representing pixels forming a first image;

storing a frame of said first pixel signals in a first addressable memory area;

providing second pixel signals representing pixels forming a second image;

storing a frame of said second pixel signals in a second addressable memory area;

providing first control pixel signals representing pixels forming a first control image;

storing a frame of said first control pixel signals in a third addressable memory area as signals having a first value for pixels of a composed image based on one of said first pixel signals and said second pixel signals, a second value for pixels of said composed image based on the other of said first pixel signals and said second pixel signals, and intermediate values for pixels of said composed image based on combining proportions of said first pixel values and said second pixel values;

providing addresses for writing and reading said first and second pixel signals and said first control pixel signals into and from selected addresses of the respective memory area to maintain upon reading the respective pixel signals a desired pixel relationship between said second pixel signals and said first control pixel signals;

forming composed pixel signals representing the pixels of said composed image by: (a) selectively outputting pixel signals read from one or from the other of said first memory area and said second memory area when the first control pixel signals have respectively said first value or said second value; and (b) selectively combining said first and said second pixel signals output from said first memory area and said second memory area in proportions dependent upon the first control pixel values when said first control pixel signals have said intermediate values;

displaying said composed image; and manually controlling the step of providing addresses to cause the spatial relationship of the second image together with the first control image to be smoothly and selectively modified relative to the first image;

whereby the second image from the second memory area, as defined by said first control image, moves progressively and selectively relative to the first image from the first memory area by said manual control of the addressing while the corresponding selective and progressive spatial changes of the displayed composed image are observable.

29. A method according to claim 28 including the step of painting with an electronic brush said first control image, said electronic brush having a shape in one or both of intensity and color to paint in inherently non-aliased strokes, and storing the image resulting from said painting step in said step of storing a frame of said first control pixel signal as said first control image.

30. A method according to claim 28 including painting with an electronic brush over said composed image, using said first control image as a painting mask.

31. A method according to claim 28 including controlling the pixel values of said first control image to cause the step of displaying said composed image to display said second image as a selectively transparent image.

* * * * *

UNITED STATES PATENT AND TRADEMARK OFFICE
CERTIFICATE OF CORRECTION

PATENT NO. : 5,459,529
DATED : October 17, 1995
INVENTOR(S) : Anthony D. Searby, Paul R.N. Kellar and Richard J. Taylor It is certified that error appears in the above-identified patent and that said Letters Patent is hereby corrected as shown below:

On the cover page, lines 5-6 of the left column should read:

—[75] Inventors: Anthony D. Searby, Newbury; Paul R.N. Kellar, Newbury; and Richard J. Taylor, London, all of England—.

Signed and Sealed this

Fifteenth Day of April, 1997

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO. : 5,459,529
DATED : October 17, 1995
INVENTOR(S) : Anthony D. Searby, Paul R.N. Kellar and Richard J. Taylor It is certified that error appears in the above-indentified patent and that said Letters Patent is hereby corrected as shown below:

On the title page, after line 30 of the left column insert:

--[30]     Foreign Application Priority Data

Jan. 15, 1982  [GB]  United Kingdom................. 8201136--

Col. 15, line 52, change "second" to --first--

Signed and Sealed this

Ninth Day of September, 1997

Attest:

BRUCE LEHMAN

*Attesting Officer*     *Commissioner of Patents and Trademarks*